Oct. 4, 1966   H. D. KRAFT ET AL   3,277,356
PUMP ARRANGEMENT FOR DISPENSING PREDETERMINED
QUANTITIES OF LIQUID
Filed Dec. 12, 1963   4 Sheets-Sheet 2

HAROLD D. KRAFT
JACK A. KRAFT
*INVENTORS*

BY *George B. Oujevolk*

ATTORNEY

Oct. 4, 1966

H. D. KRAFT ET AL 3,277,356

PUMP ARRANGEMENT FOR DISPENSING PREDETERMINED
QUANTITIES OF LIQUID

Filed Dec. 12, 1963

HAROLD D. KRAFT
JACK A. KRAFT
INVENTORS

BY George B. Oujevolk

ATTORNEY

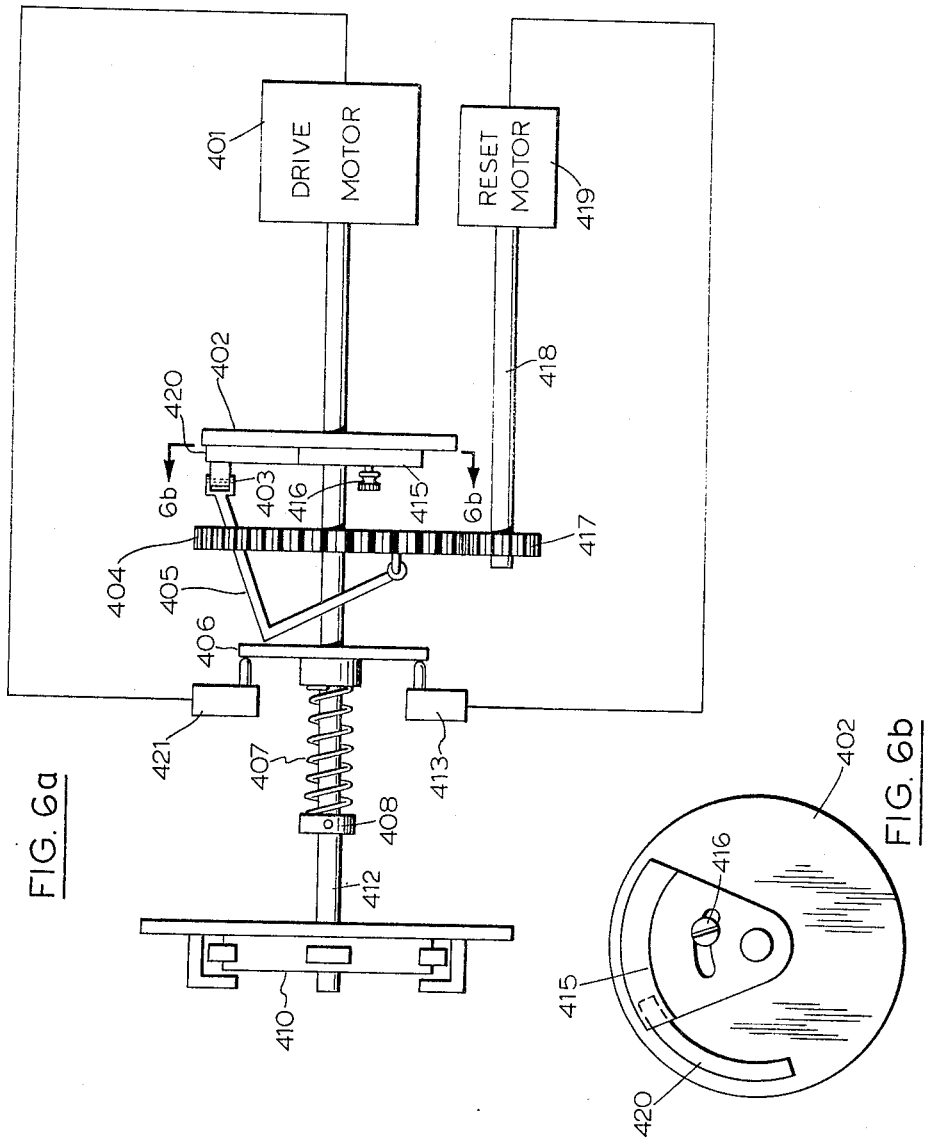

United States Patent Office 3,277,356
Patented Oct. 4, 1966

3,277,356
PUMP ARRANGEMENT FOR DISPENSING PREDETERMINED QUANTITIES OF LIQUID
Harold D. Kraft, 68—60 140th St., Flushing, N.Y., and Jack A. Kraft, 119 Elm Lane, New Hyde Park, N.Y.
Filed Dec. 12, 1963, Ser. No. 330,071
12 Claims. (Cl. 318—160)

The present invention relates to the measured dispensing of liquids and more particularly to an arrangement useful with dispensing pumps forming part of an automatic chemical analyzer to enable the pump to supply measured quantities of liquid to treating stations of the apparatus.

Automatic chemical analysis apparatus have already been described as for example in the Samuel Natelson U.S. Patent No. 3,036,893 and in the Samuel Natelson U.S. patent application Serial No. 234,019, filed October 30, 1962, now Patent No. 3,219,416, entitled "Apparatus for the Automatic Chemical Sequential Treatment and Analysis of Small Quantities of Material." In this patent application, there has been described a piece of apparatus for performing chemical analysis having a dispensing disc with a plurality of capillary tube dispensing assemblies disposed thereon. Associated with the dispensing disc is a supporting disc for receiving the samples. Each dispensing assembly includes means to hold a capillary tube therein and means to tilt the tube held by the assembly so as to discharge the contents of the tube into a receptacle therefor on the support disc. The discs are rotated in timed relation with the tilting of the capillary tubes by intermittent moving means past a plurality of treating stations where reagent is supplied, the sample and reagent are stirred, gas is supplied, heat is applied, and the results are read. In connection with this type of apparatus, pumping means to supply either sample or reagent are required at certain stations which should be supplied in measured quantities.

Although many attempts may have been made to provide an arrangement whereby predetermined quantities of liquid can be supplied at a treating station, none, as far as we are aware have been successful when carried out in practice on an industrial scale.

Thus, it is an object of the present invention to provide an arrangement whereby measured quantities of a liquid can be delivered.

Another object of the present invention is to provide an arrangement whereby the measured quantity to be delivered can be varied.

Still another object of the present invention is to provide a simple arrangement which can be affixed to existing pumps for delivering measured quantities liquid.

With the foregoing and other objects in view, the invention resides in the novel arrangement and combination of parts, in the details of construction, and in the process steps hereinafter described and claimed, it being understood that changes in the precise embodiment of the invention herein disclosed may be made within the scope of what is claimed without departing from the spirit of the invention.

Generally speaking, the present invention contemplates an arrangement for use with a pump driven by an electric motor and drive shaft which will drive the drive shaft through a predetermined angle so as to deliver a measured quantity of liquid. This arrangement comprises switch engaging means disposed so as to be turned by said motor along an arcuate path; an electrical circuit for operating said motor; switch means in said circuit at a predetermined position along the arcuate path of travel of said switch engaging means; and, return means responsive to said switch engaging means whereby said motor will turn said switch engaging means until they engage said switch means stopping said motor, the return means then returning said switch engaging means to its original position to repeat the sequence.

The invention will appear more clearly from the following detailed description when taken in connection with the accompanying drawing, showing by way of example, preferred embodiments of the inventive idea, in which:

FIGURE 6A is a longitudinal side view of another embodiment of the invention; and, FIGURE 6B is a view along the lines 6B—6B of FIGURE 6A.

Figure 1:
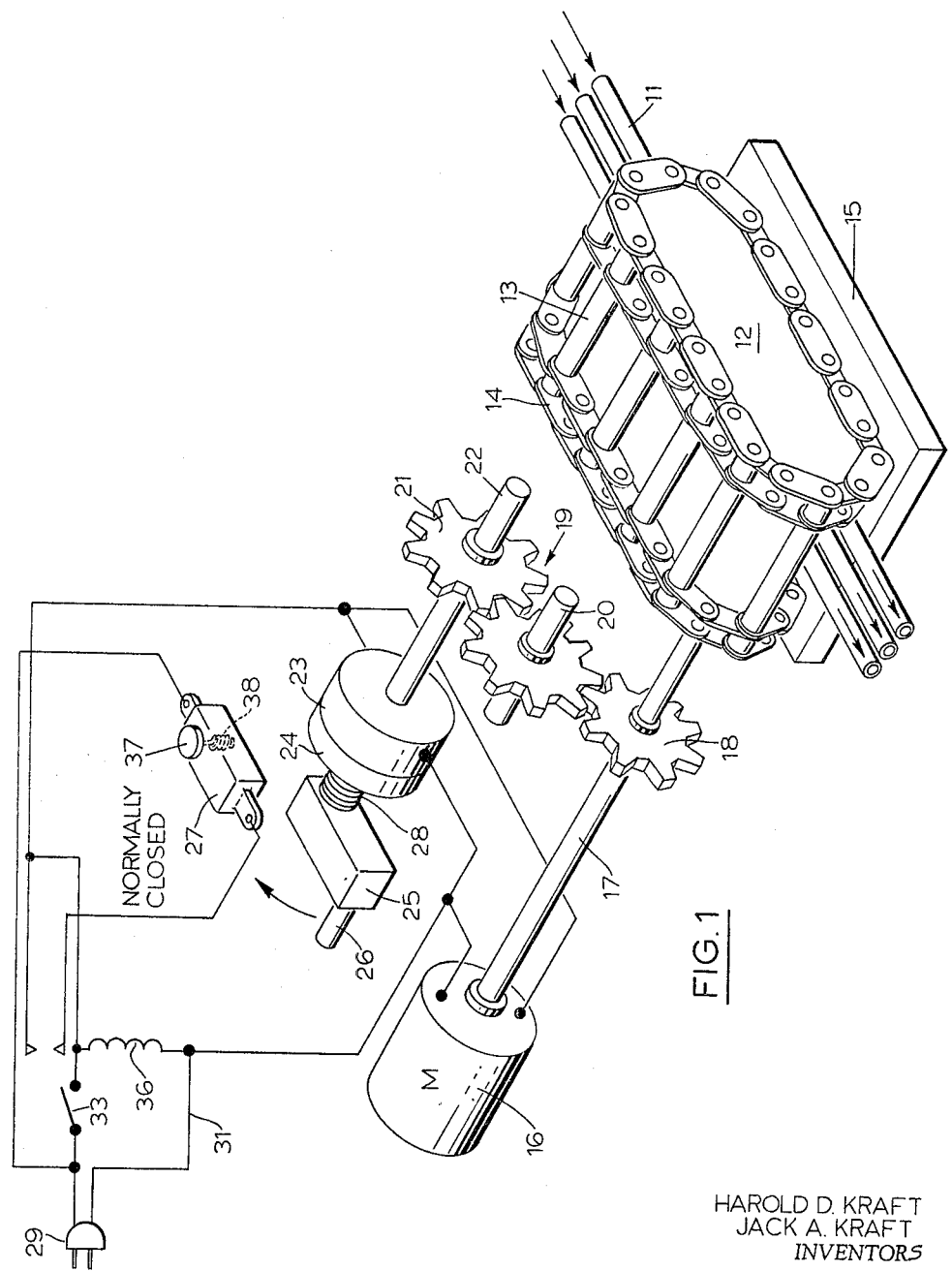
FIGURE 1 is a perspective view of the mechanical arrangement contemplated herein with the electrical circuitry depicted schematically.

Before going into the detailed solution of the problem presented it is advantageous to first analyze the problem. There are at present certain cyclic or interval timing devices commercially available. These devices will supply drive current for a certain time interval then stop for a certain time interval then again supply drive current for the same or a different time interval, the sequence being endlessly repeated until a switch is opened. There are also other intermittent motion devices commercially available such as for motion pictures, etc. At first glance, it would appear that a fixed quantity of fluid can readily be delievered using one of these arrangements. However, experiments have shown that this is not the case. The reasons for this are many. Different liquids by their nature require different handling. Temperature gas contents of the liquid, capillarity etc. all effect the quantity delivered. The liquid being pumped produces a torque on the motor driving the pump which torque is not the same under the varying conditions mentioned. The problem may perhaps best be understood by a study of FIGURE 1. Here is shown a series of tubes 11 used in delivering liquid to a station on an automatic chemical analyzer. These tubes 11 are acted on by a commercially available pump 12 having a series of rollers 13 moved in caterpillar fashion by sprocket chain threads 14. The tubes 11 are squeezed by rollers 13 against a baseboard 15 and the entire pump is turned by a motor 16. Forgetting about the other components shown in FIGURE 1 for the moment. If motor 16 were turned intermittently instead of continuously there would be waves of liquid being delivered from tubes 11 and not measured quantities. A study of FIGURE 1 leads to the conclusion that it is not running time but angular displacement of the drive shaft 17 which fixes the quantity of fluid delivered. Although again the first impression may be that the two are one and the same, in practice they are not since for most motors, the angular displacement for shaft 17 for a fixed interval of time will depend on the load acting on the shaft.

Figure 2:
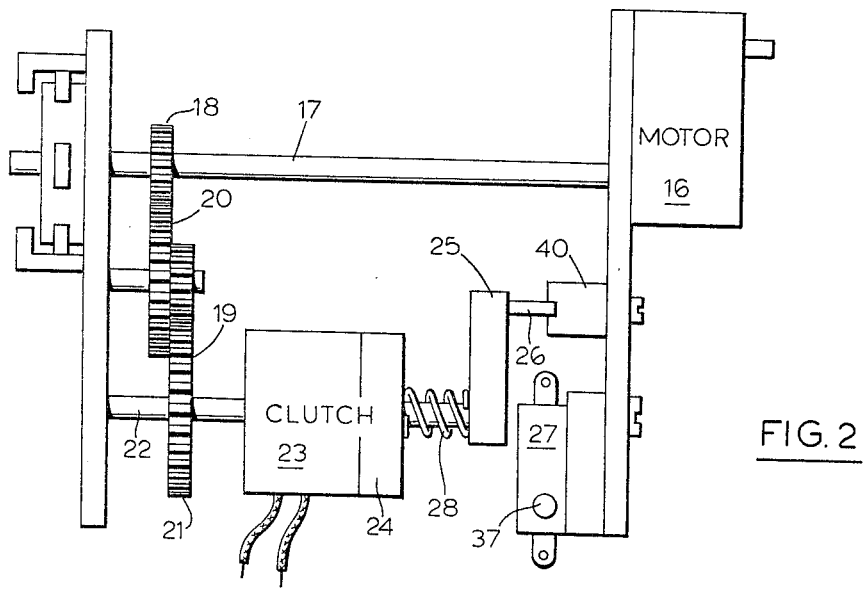
FIGURE 2 is a longitudinal top view of the arrangement of FIGURE 1 but without the electrical circuitry.

The present invention therefore contemplates an arrangement whereby shaft 17 will turn through a predetermined angle to deliver a measured quantity rather than turn for a predetermined time. Thus as shown in FIGURES 1 and 2 there is located on drive shaft 17 a gear 18 which is part of a gear train 19 having a countershaft 20 and a follower 21. Follower 21 in turn acts on a shaft 22 disposed parallel to drive shaft 17. Shaft 22 drives an electro-magnetic clutch 23 which in turn when energized will turn control section 24. Mounted on control section 24, is an arm 25 with a pin 26. When control section 24 turns, it will carry with it arm 25 and move the arm acting as a radius through an angle so that pin 26 travels along an arcuate path. At a predetermined angle along this path is a button switch 27 which will be acted on by pin 26. Button switch 27 opens the electrical circuit to relay 36, motor 16 and clutch 23 stopping the motor and releasing both the clutch and the relay. A spring 28 coiled around control shaft 24 returns the arm 25 to its original position. The electrical circuitry controlled by control switch 27 includes a plug 29 for coupling to a power source (not shown). From plug 29 is a circuit 31, having a momentary type start switch 33, a relay 36 and a normally closed button switch 27. Relay 36 closes the portion of the circuit supplying power in parallel to itself, as well as clutch 23 and motor 16. Button switch 27 includes a spring loaded button 37 biased so that the switch is normally on because of spring 38.

Once start switch 33 is momentarily pressed, it will close relay 36. The motor 16 starts and the clutch grabs. Arm 25 moves up until pin 26 hits button 37. This opens the circuit to the relay motor and clutch. The relay opens, the motor stops, the clutch releases and arm 25 snaps back. Then, spring 38 closes switch 27, and the circuit is ready to be recycled.

Figure 3:
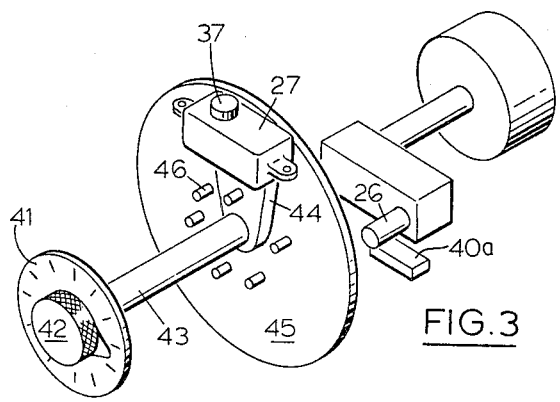
FIGURE 3 shows a modification of a portion of the arrangement of FIGURE 1 to provide mechanical adjustment.

The device of FIGURES 1 and 2 will deliver predetermined quantities of liquid determined by the arc which pin 26 travels from a stop 40 to button 37. By varying the position of the button 37 it is possible, to vary the quantity delivered. Thus as shown in FIGURE 3 button 37 on switch 27 is angularly displaced by about 90° from stop 40a. But, the position of the button can be varied since the button forms part of an adjustable assembly comprising an indicator panel 41 which can be graduated in quantities, e.g., cubic centimeters, and a knob and pointer 42 which is coupled to a shaft 43. Mounted on shaft 43 is a triangular switch holder 44 which maintains button 37 at an arcuate position where it can be hit by pin 26. Triangular switch holder 44 is turned by turning knob and pointer 42. The triangular switch holder normally rests against a fixed disk 45 and is held in place by pins 46. In the embodiment shown there is a central hole in triangular switch holder so that the switch is pulled out and moved over the proper pin. But actually only one removable pin will suffice provided there are also holes in disc 45.

Figure 4:
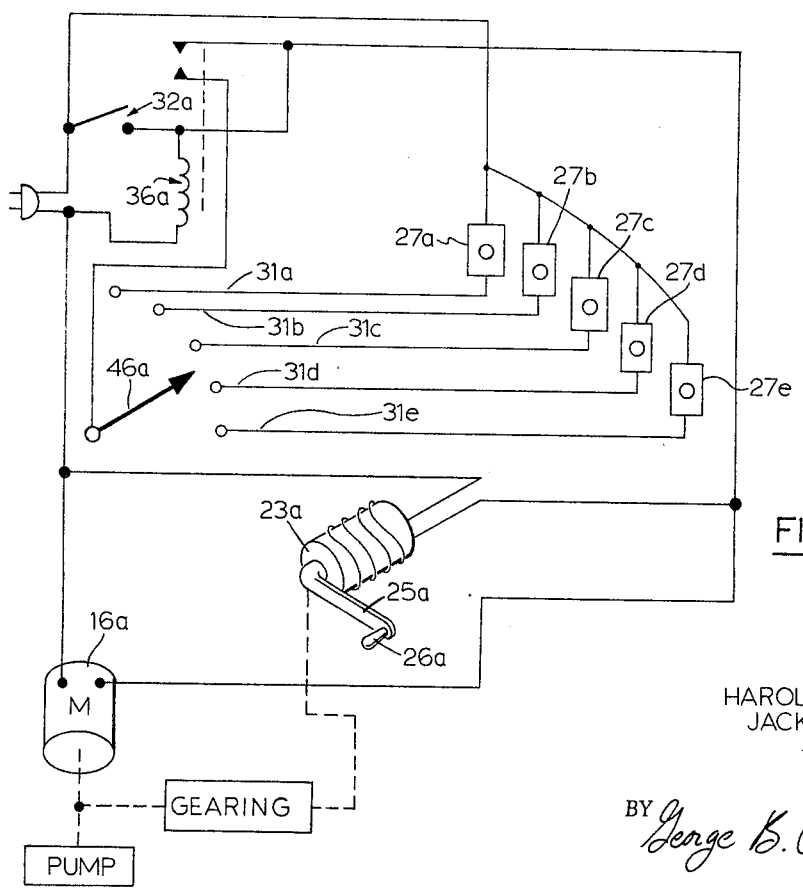
FIGURE 4 depicts schematically how the adjustment achieved in FIGURE 3 may also be performed electrically.

The mechanical adjustment illustrated in FIGURE 3 can also be done electrically as shown in FIGURE 4. Here we have a motor and clutch circuit operated by closing switch 32a. This motor and clutch circuit has a plurality of parallel lines 31a or 31b or 31c or 31d or 31e. Only one of these parallel lines is in the closed circuit depending on the disposition of a coupling line 46a (shown as a pointer). In each one of these parallel lines is a button switch 27a, 27b, 27c, 27d, 27e, which will open the circuit when acted on by pin 26a on arm 25a. Relay 36a closes the circuit to motor 16a and clutch 23a. Clutch 23a moves arm 25a with pin 26a on the end thereof in an arcuate path. Pin 26a will hit each button switch in sequence but only when the particular button switch whose line is closed by coupling line 46a is hit, will the circuit with the motor and clutch be open, therefore, the amount of angular rotation of arm 25a depends on the position of coupling line 46.

Figure 5:
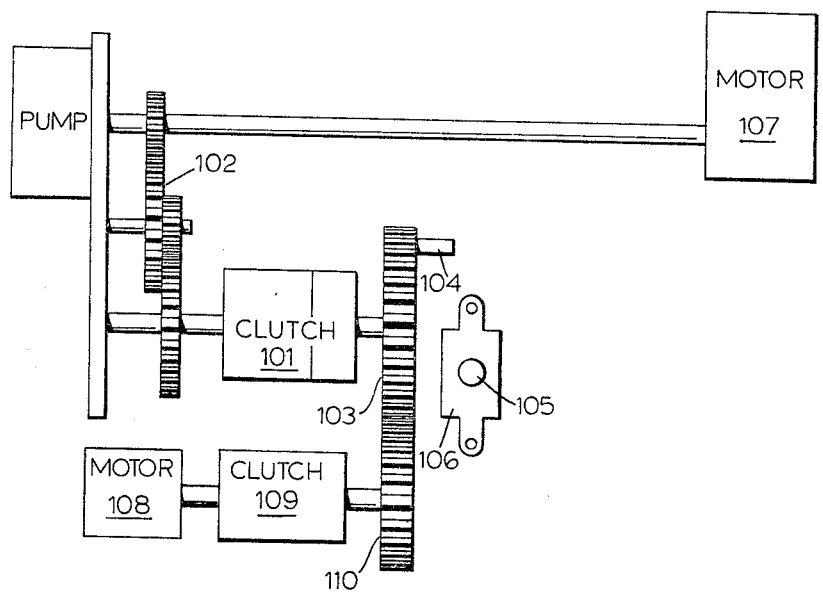
FIGURE 5 is top view partially schematic partially in block diagram of another embodiment of the inventive concept of FIGURE 1.

The angular displacement of shaft 22 of FIGURE 1, i.e., of the clutch drive shaft depends on spring 28 to return to its starting position. Another method of accomplishing this is to use a second motor. In FIGURE 5 we have an arrangement somewhat similar to that shown in FIGURE 2. When the pump is started, clutch 101 grabs, and gear train 102 starts turning the clutch which has coupled to it a first clutch gear 103 having a peripheral pin 104. This pin will hit button 105 of switch 106 and open up the switch. This will stop the motor 107 and release the clutch 101 but when this happens, a second motor 108 starts a second clutch 109 and turns a second clutch gear 110 linked to gear 103, and drives pin 104 back to its original position. Depending on the electrical circuitry, the operation can then stop or be repeated. In this system the amount of fluid fed by the pump depends on the angular distance between two switches, the location of one or both switches can be varied as shown in FIGURE 3 and FIGURE 4.

Another embodiment whereby a second motor is used to reset the system after delivery of a quantity of liquid is shown in FIGURES 6A, 6B.

Here is a drive motor 401 which transmits power through a shaft 412 to a peristaltic pump 410. Between the motor and the pump on shaft 412 is a plate 402. Mounted on plate 402 are cams 415 and 420 disposed in a telescoping arrangement. The arc covered by the two cams can be adjusted by means of an adjustment screw 416. Riding over the two cams is a roller 403 mounted on a lever arm 405. The lever arm 405 in turn is mounted on a gear wheel 404 which is set loosely on shaft 412 so as not to turn with the shaft. Pressing on the lever arm 405 is a disc 406 maintained in engagement with the lever arm by a spring 407 coiled around shaft 412 and resting against a spring base 408. As long as roller 403 is on the cam, disc 406 is maintained away from the drive motor by lever arm 405 but when the roller 403 leaves the cam, the disc 406 moves towards the motor. When held away from the motor, disc 406 acts on two switches 413 and 421. Switch 421 controls the drive motor 401 while switch 413 controls reset motor 419. However, the switches are so disposed, that when switch 413 is on, switch 412 is off. When the start switch 422 is pressed, drive motor will turn, drive shaft 412, turning the pump and plate 402. Since the roller 403 is riding on the cams, disc 406 is pressing against switches 413 and 421. This makes switch 413 open and switch 421 closed. As the roller comes to the end of the cams, disc 406 snaps towards the motor which closes switch 413 and opens switch 421. Reset motor 419 starts and turns reset shaft 418. Mounted on reset shaft 418 is drive gear 417 which engages gear wheel 404 driving it to a point where the roller again mounts the cams. If the roller is off the cams when the start switch is pressed, the reset motor is actuated driving gear wheel 404 until the roller is back on the cam.

It is to be observed therefore that the present invention provides for an arrangement for use with a pump driven from a motor by a drive shaft, whereby the drive shaft is turned through a predetermined angle to deliver a measured quantity of liquid. Generally this is accomplished by means of an auxiliary shaft parallel to said drive shaft, gearing between the two shafts to turn the auxiliary shaft as the drive shaft is rotated; electromechanical clutch means on the auxiliary shaft with switch engaging means radially displaced from the auxiliary shaft. A switch is located at a predetermined position along the path of travel of the switch engaging means. Return means are coupled to the switch engaging means, so that the motor will turn the drive shaft until the switch engaging means engages the switch stopping the motor and releasing the clutch means. The return means then return the switch engaging means to the original position. The angular distance between the switch engaging means and the switch determines the quantity delivered by the pump. This distance may be adjusted by angularly displacing the switch along the arcuate path of travel of the switch engaging means and this distance may be varied by mechanically or electrically adjusting the switch position. This is done mechanically by using a triangular-shaped holder for the switch engaging means as shown in FIGURE 3. Or, this may be done electrically by having a plurality of switches disposed along the path of travel with only one of the switches being in the closed circuit at a time as determined by position of a coupling line. The return means may be a spring, or a reset motor arrangement.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:
1. In combination with a pump having means for displacing a preselected quantity of fluid proportional to movement imparted to the pump, motor means connected to the pump for imparting said movement thereto when energized, an electrical circuit connected to said motor means for energization thereof, adjustably positioned switch means in said circuit for deenergizing said motor means when actuated, switch engaging means continuously driven by the motor means while energized for actuating the switch means after the pump has displaced said preselected quantity of fluid, and return means operatively connected to the switch engaging means for automatic resetting thereof to a starting position in response to deenergization of the motor means.

2. In combination with a pump having means for displacing a preselected quantity of fluid proportional to movement imparted to the pump, motor means connected to the pump for imparting said movement thereto when energized, an electrical circuit connected to said motor means for energization thereof, adjustably positioned switch means in said circuit for deenergizing said motor means when actuated, switch engaging means displaceable along a predetermined path of travel for actuating the switch means to deenergize the motor means, clutch means energized and deenergized simultaneously with the motor means for drivingly connecting the switch engaging means to the motor means and return means operatively connected to the switch engaging means for automatic resetting thereof to a starting position in response to deenergization of the motor means.

3. In combination with a pump having means for displacing a preselected quantity of fluid proportional to movement imparted to the pump, a drive motor connected to the pump, first switch means connected to the drive motor for energization thereof when actuated, a reset motor, second switch connected to the reset motor for energization thereof when actuated, switch actuating means displaceable between two operative positions alternatively actuating said first and second switch means, adjustable cam means operatively connected to the switch actuating means for displacement thereof between said two positions thereof and gear means drivingly connecting the reset motor to the cam means.

4. An arrangement as claimed in claim 1 wherein the location of said switch means is mechanically adjustable.

5. An arrangement as claimed in claim 1 wherein the location of said switch means is electrically adjustable.

6. An arrangement as claimed in claim 1 wherein said return means are spring means.

7. An arrangement as claimed in claim 1 wherein said electric motor is a first motor and said return means is a second electric motor, first enabling means to start said second motor when said first motor is stopped so as to return said switch engaging means to said starting position.

8. An arrangement as claimed in claim 1 wherein said electric motor is a first motor and said return means is a second electric motor, first enabling means to start said second motor when said first motor is stopped so as to return said switch engaging means to said starting position, and second enabling means to start said first motor when acted on by said switch, engaging means returning to said starting position.

9. An arrangement as claimed in claim 2 wherein the location of said switch means along said path of travel is mechanically adjustable, including a fixed disc axially disposed with respect to said clutch means a triangular switch holder axially disposed with respect to said disc, said switch means being mounted thereon, and fastening means to fix said triangular switch holder to said fixed disc so that said switch means is disposed at various positions along the periphery of said disc.

10. An arrangement as claimed in claim 2 wherein the location of said switch means along said path of travel is electrically adjustable, said switch means comprising a plurality of parallel switches arcuately disposed along the path of travel of said switch engaging means and, a coupling line connectable to only one of said switches to complete the circuit to said clutch and motor means, the clutch and motor means being deenergized only when the particular switch connected to the coupling line is engaged by said switch engaging means.

11. In a pump driven by an electric motor and drive shaft, an arrangement to turn said drive shaft through a predetermined angle so as to deliver a measured quantity from said pump, comprising in combination;
   first and second switch means disposed in the vicinity of said drive shaft so set that one switch is off unless engaged while the other switch is on unless engaged;
   a disc around said shaft for engaging said first and second switch means actuating one switch on and the others off;
   spring means urging said disc out of engagement with said first and second switch means;
   arcuate cam means axially aligned with said disc partly encircling said shaft;
   a lever and roller interposed between said cam and disc urging said disc into engagement with said first and second switch means when said roller rides said cam means but freeing said disc from engagement when said roller is off said cam means;
   a gear which idles on said shaft coupled to said lever and roller to turn said roller around said cam means;
   a first circuit between said first switch means and said electric motor; and
   a reset motor and drive gear driving said gear wheel and a circuit between said second switch means and said reset motor.

12. A device as claimed in claim 11, the arc spanned by the cam means being adjustable.

References Cited by the Examiner
UNITED STATES PATENTS

| | | | |
|---|---|---|---|
| 1,734,919 | 11/1929 | Scott | 318—468 X |
| 2,222,990 | 11/1940 | Shipley et al. | 318—160 |
| 2,223,207 | 11/1940 | Ellis | 318—466 |
| 2,312,077 | 2/1943 | Cowles | 318—466 |
| 2,509,287 | 5/1950 | Boylan | 318—160 |
| 2,637,835 | 5/1953 | Davidson | 318—466 X |
| 3,234,448 | 2/1966 | Link | 318—443 |

ORIS L. RADER, *Primary Examiner.*

J. C. BERENZWEIG, *Assistant Examiner.*